Patented Sept. 21, 1937

2,093,752

UNITED STATES PATENT OFFICE 2,093,752

OLEFINE SULPHIDE

Werner W. Duecker and Claron R. Payne, Pittsburgh, Pa., assignors to Texas Gulf Sulphur Company, a corporation of Texas No Drawing. Application September 6, 1934, Serial No. 742,910

4 Claims. (Cl. 260—6)

This invention relates to the production of olefine sulphide, an amorphous and inert plastic, susceptible to vulcanization.

We have discovered that if a solution be prepared of sulphur in a high-boiling-point, inert solvent, and if the solution be maintained in liquid condition, and if butylene be then dispersed in the solution, reaction will occur, butylene sulphide will be formed; and the butylene sulphide, itself insoluble in the solvent, will be deposited in the form of a sludge. The sludge may then be separated by decantation, and with proper solvents washed free of the initial solvent and of uncombined sulphur, and the so-purified butylene sulphide will then remain, applicable to suitable uses. Butylene may conveniently be found for the purposes of the invention in the gas known to the industry as still gas.

Of the solvents for sulphur, we have found the chlorinated naphthalenes and diphenyls the most suitable, and of these chlorinated diphenyl is preferred. Not all solvents for sulphur are suitable. Aniline and coal-tar distillates, for examples, are not. When using aniline or a coal-tar distillate as the solvent for sulphur a reaction product is obtained which is completely soluble in carbon bisulphide and benzene, but only partially soluble in acetone. No sludge separates from the initial reaction mixture.

Employing, however, a suitable and preferred solvent, the reaction will occur, whatever be the degree of concentration of the solution; and we have found that, within practical limits, the weaker the solution, the larger is the portion of the sulphur that will give itself up to reaction with the butylene. The solvent being chlorinated diphenyl, the solution is, for the practice of the invention, maintained at an elevated temperature, not exceeding 160° C.

The reaction may be carried out under pressure. Since the object is to bring into contact a gas with the sulphur in solution, and since this contact is determined in part by the solubility of the gas in the solvent, any expedient (and increasing pressure is such) which will increase the amount of gas going into solution with the solvent will hasten the reaction. Manifestly operation under pressure makes practicable the use of solvents of lower boiling-point.

Dispersion of butylene in the hot and liquid solution is most readily effected by causing the butylene in its normally gaseous state to bubble through the solution. The smaller the bubbles of the gas (and the larger the surface relatively to volume), the larger the portion of butylene that goes into reaction. The extent of the reaction is conditioned also by the rate at which the gas is passed through the solution. Efficient dispersion may be obtained by causing the gas to pass through a porous earthenware plate or through a metallic screen of fine mesh in gaining access to the solution. Again, a whirling disk may be employed to aid in the dispersion of the injected gas; and there are other known methods of effecting such dispersion.

The rate of reaction may be accelerated by a catalyst. Suitable catalysts are found in inorganic oxides, inorganic sulphides, the halogens, and halogen compounds; and typical of these are aluminum oxide, phosphorus sulphide, iodine, and mercuric iodide.

Solution of sulphur in the solvent (chlorinated diphenyl) is effected at approximately 100° C. The reaction in which the invention resides is effected at a temperature not exceeding 160° C., because at temperatures exceeding that value decomposition will occur of the product of reaction. Within limit named, the higher the temperature the more rapid the reaction.

This reaction product is, as has been said, an amorphous and inert plastic, susceptible to vulcanization, in much the same manner as is rubber, to form a stable elastic material. Due to its inertness, it may be used advantageously to form gaskets, hose, protective coatings for metal, etc. The product, unvulcanized, may be dissolved and used to plasticize sulphur, and the so plasticized sulphur may be used as cement, and as a protective material, for coating bodies of steel, concrete, and other substances. Fibrous material may be impregnated with sulphur plasticized with butylene sulphide, and the material may then be shaped to desired form. Similarly, porous bodies generally may be impregnated.

What we have said of butylene is true of other olefines, and particularly, of ethylene. It too may be dispersed in its normally gaseous state in a hot solution of sulphur, with consequent reaction, and the precipitation of an olefine sulphide, which settles as a sludge. The sludge may be separated and cleansed in the manner described. It is wholly analogous to butylene sulphide in its chemical composition, and in those physical qualities and adaptabilities that have been described, and is susceptible to like uses.

We claim as our invention:

1. The method herein described of producing olefine sulphide which consists in dispersing an olefine gas in a liquid solution of sulphur in a solvent incapable under the reaction conditions of dissolving olefine sulphide and maintained at a temperature not exceeding 160° C., and separating the product of reaction.

2. The method herein described of producing butylene sulphide which consists in dispersing butylene gas in a hot solution of sulphur in chlorinated diphenyl, and separating the product of reaction.

3. The method herein described of producing butylene sulphide which consists in maintaining a solution of sulphur in chlorinated diphenyl at a temperature not exceeding 160° C., dispersing butylene gas in the hot solution, and separating the product of reaction.

4. The method herein described of producing olefine sulphide which consists in dispersing an olefine gas in a solution of sulphur in the presence of a catalyst selected from a group that consists of iodine and mercuric iodide in a liquid solvent incapable under the reaction conditions of dissolving olefine sulphide and while the solution is maintained at a temperature not exceeding 160° C., and separating the product of reaction.

WERNER W. DUECKER.
CLARON R. PAYNE.